(12) United States Patent
Saunders

(10) Patent No.: US 11,605,058 B2
(45) Date of Patent: Mar. 14, 2023

(54) SYSTEMS AND METHODS FOR TRANSFERRING ELECTRONIC SUBSCRIPTION DATA

(71) Applicant: SHOPIFY INC., Ottawa (CA)

(72) Inventor: Robert Saunders, Toronto (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/339,089

(22) Filed: Jun. 4, 2021

(65) Prior Publication Data

US 2022/0391862 A1 Dec. 8, 2022

(51) Int. Cl.
*G06Q 20/08* (2012.01)
*H04L 51/42* (2022.01)
*H04L 67/02* (2022.01)
*H04L 51/08* (2022.01)

(52) U.S. Cl.
CPC .......... *G06Q 20/085* (2013.01); *H04L 51/08* (2013.01); *H04L 51/42* (2022.05); *H04L 67/02* (2013.01)

(58) Field of Classification Search
CPC ....... G06Q 20/085; H04L 51/08; H04L 51/42; H04L 67/02
See application file for complete search history.

(56) References Cited

FOREIGN PATENT DOCUMENTS

| CA | 3058613 A1 | * | 6/2020 | ........... G06Q 20/102 |
|---|---|---|---|---|
| WO | WO-2020264587 A1 | * | 12/2020 | ............. G06Q 10/10 |

* cited by examiner

*Primary Examiner* — Cheikh T Ndiaye

(57) ABSTRACT

A user may purchase a subscription service online, which may be purchased as a gift for a gift recipient. At the end of the gifted subscription, the gift recipient may wish to continue the subscription without interruption. However, the subscription order may be stored in memory in association with the purchaser, and there may be no way to automatically link, in memory, the data in a gift subscription order and the data in a new subscription ordered by the gift recipient. In some embodiments, data associated with a subscription order includes a subscription transfer object, which stores subscription information specific to the subscription recipient and omits personal information associated with the purchaser. In some embodiments, a subscription identifier is issued to the recipient, which, when provided to the platform, allows the subscription transfer object to be transferred over to a new subscription for the recipient.

20 Claims, 12 Drawing Sheets

| E-Commerce Platform | Q Search | JG John's Apparel / Jonny B. Good |
|---|---|---|
| 🏠 Home<br>↩ Orders<br>🏷 Products<br>👤 Customers<br>📊 Reports<br>🏷 Discounts<br>⊞ Apps<br><br>SALES CHANNELS ⊕<br>🏬 Online Store<br>📱 Mobile App<br>View all channels<br><br>⚙ Settings | Good afternoon, Jonny B..<br>Here's what's happening with your store today.<br><br>Today's total sales    Today's visits<br>$98.00                 1<br><br>● Update your Platform Payments tax details<br>We require additional information to verify your identity.<br>[Update tax details]<br><br>● Advanced Cash on Delivery has been deactivated for your store<br>[See why] | All channels ⌄                          Today ⌄<br><br>TOTAL SALES<br>$98.00<br><br>$125<br>$75                                            Jun 1<br>$25                                         2 orders<br>    12am   8pm   4pm   11pm<br><br>TOTAL SALES BY CHANNEL     View dashboard<br>Online Store                                Jun 1<br>$0.00                                     0 orders<br><br>Mobile app<br>$0.00                                     0 orders<br><br>Shopify POS (126 York St.)<br>$0.00                                     0 orders |

FIG. 2

| 602 | 604 | 606 | 608 |
|---|---|---|---|
| 123 Main Street, New York, New York, USA, 10001 | Billing address | 2020-12-20 | |
| VISA, 4000 XXXX XXXX XXXX, 12/21, 001 | Payment details | 2020-12-20 | |
| john_buck@examplemail.com | Purchaser email address | 2020-12-20 | |
| 212-000-0001 | Purchaser telephone number | 2020-12-20 | |
| Six month subscription | Subscription duration | 2020-12-20 | AX4C8NjqR753bL |
| One box per month | Subscription frequency | 2020-12-20 | AX4C8NjqR753bL |
| 1000 Oak Avenue, New York, New York, USA, 10002 | Shipping address | 2020-12-20 | AX4C8NjqR753bL |
| jane_doe@examplemail.com | Recipient email address | 2020-12-20 | AX4C8NjqR753bL |
| Peanuts | Product restriction | 2020-12-20 | AX4C8NjqR753bL |
| Chocolate | Product preference | 2020-12-20 | AX4C8NjqR753bL |
| First box sent | Subscription shipment | 2021-01-01 | AX4C8NjqR753bL |
| Second box sent | Subscription shipment | 2021-02-01 | AX4C8NjqR753bL |
| Coconut | Product preference | 2021-02-16 | AX4C8NjqR753bL |
| Third box sent | Subscription shipment | 2021-03-01 | AX4C8NjqR753bL |

FIG. 6

TreatTote ORDER CHECK

BILLING ADDRESS:

Street Address: [123 Main St., NY]  ZIP Code: [10001]  State: [NY]

Email address: [john_buck@examplemail.com]  Tel. No.: [212-000-0001]

⎱ 502

BILLING INFORMATION:

Card No.: [4000 XXXX XXX XXXX]  Card Expiry: [12/21]  CVV: [001]

Is this purchase a gift ☑ ~702

SHIPPING ADDRESS:

Street Address: [1000 Oak Ave., NY]  ZIP Code: [10002]  State: [NY]

Email address: [jane_doe@examplemail.com]

⎱ 506

ALLERGIES/ DIETARY RESTRICTIONS: [Peanuts]

PREFERENCES: [Chocolate]

[ Check Out ]

FIG. 7

TreatTote

Snack Subscription Box

To continue your subscription, please enter your billing information:

BILLING ADDRESS:

Street Address: [____] ZIP Code: [__] State: [_]

Email address: [____] Tel. No.: [____]

BILLING INFORMATION:

Card No.: [_____] Card Expiry: [__] CVV: [_]

NEXT →

FIG. 9

TreatTote
Snack Subscription Box

900

Based on the information from your gift subscription, we have an idea of what you like to munch on. Please confirm the following, and select more options if applicable:

My favorite snacks can be described as:

[ Chocolate ]  [ Coconut ]

Add one or more of: (optional)

1000

[ Caramel ]  [ Salty ]     [ Licorice ]
[ Mint ]     [ Sriracha ]  [ Cookies ]
[ Lemon ]    [ Crunchy ]

⬅ BACK                    NEXT ➡

FIG. 10

| | | | |
|---|---|---|---|
| One box per month | Subscription frequency | 2020-12-20 | AX4C8NjqR753bL |
| 1000 Oak Avenue, New York, New York, USA, 10002 | Shipping address | 2020-12-20 | AX4C8NjqR753bL |
| jane_doe@examplemail.com | Email address | 2020-12-20 | AX4C8NjqR753bL |
| Peanuts | Product restriction | 2020-12-20 | AX4C8NjqR753bL |
| Chocolate | Product preference | 2020-12-20 | AX4C8NjqR753bL |
| First box sent | Subscription shipment | 2021-01-01 | AX4C8NjqR753bL |
| Second box sent | Subscription shipment | 2021-02-01 | AX4C8NjqR753bL |
| Coconut | Product preference | 2021-02-16 | AX4C8NjqR753bL |
| Third box sent | Subscription shipment | 2021-03-01 | AX4C8NjqR753bL |
| Fourth box sent | Subscription shipment | 2021-04-01 | AX4C8NjqR753bL |
| Fifth box sent | Subscription shipment | 2021-05-01 | AX4C8NjqR753bL |
| 1000 Oak Avenue, New York, New York, USA, 10002 | Billing address | 2021-05-10 | |
| VISA, 4000 XXXX XXXX XXXX, 11/22, 101 | Payment details | 2021-05-10 | |
| 212-101-0110 | Telephone number | 2021-05-10 | |
| Twelve month subscription | Subscription duration | 2021-05-10 | |
| Crunchy | Product preference | 2021-05-10 | |

FIG. 11

SYSTEMS AND METHODS FOR TRANSFERRING ELECTRONIC SUBSCRIPTION DATA

FIELD

The present application relates to transferring subscription data to the recipient of an electronically gifted subscription.

BACKGROUND

An online store or online marketplace may offer the ability for a user to purchase a subscription service, such as a service in which a package of one or more curated products is shipped and delivered to the user on a recurring basis. For example, a user may purchase a service from a merchant in which every month a box of snack food products is shipped by the merchant to the user. When the online order is generated, the platform hosting the online store or online marketplace stores, in memory, data associated with the order, such as the billing information (e.g. payment credit card details), the frequency of payment, the length of the subscription, the frequency at which a package of products is sent, the shipping address, etc. At the appropriate interval (e.g. at the start of each month), the platform prompts the next package to be prepared and shipped.

In some instances, a user may purchase the subscription as a gift for a gift recipient. For example, the user may purchase a subscription of a monthly box of snack food products for their friend. In these instances, the platform stores the subscription order in association with the purchaser, but with the gift recipient's shipping address. However, the gift subscription is typically only purchased for a finite predefined length of time, e.g. 6 months, at which point the gift subscription ends.

SUMMARY

At the end of the gifted subscription, the gift recipient may wish to continue the subscription without interruption. The gift recipient could go online and order a new subscription with a start date immediately after the expiry of their gifted subscription, but the new subscription order would have no association in memory with the gifted subscription. This may cause the recipient to receive a repeat of products they already received during the gift subscription, and any feedback and preferences stored in relation to the gifted subscription would not be carried over.

The problem above is the result of technical problems that exist in relation to how the subscription order data may be stored by the platform. In particular, the subscription order may be stored in memory in association with the purchaser, not the gift recipient. Indeed, the platform might not even have any information about the gift recipient other than the gift recipient's shipping address. The platform may have no way to automatically link, in memory, the data in a gift subscription order and the data in a new subscription ordered by the gift recipient. Additionally or alternatively, the gift recipient may have no way to prompt/trigger/cause the platform to transfer the data in the gift subscription to the new subscription ordered by the gift recipient. Even if a transfer of data from the gifted subscription to a new subscription could be implemented, there may still be no way for the platform to ensure privacy of the original user purchasing the gift subscription, e.g. ensuring in a transfer that the original purchaser's billing payment details or address is not transferred to the new subscription order associated with the gift recipient.

To try to address at least one of the technical problems discussed above, in some embodiments the data associated with a subscription order may include a subscription movement object, which will herein also be referred to as a subscription transfer object. The subscription transfer object may be a partition of data/data record in the memory that is predefined to store particular information associated with the subscription that is specific to the subscription recipient and omits personal information (such as billing and payment details) associated with the purchaser. In some embodiments, the subscription transfer object is associated with a unique ID, which may also be referred to as a subscription identifier, in memory. In the case of a gifted subscription nearing the end of its term, the subscription identifier is issued to the gift recipient. The recipient provides the subscription identifier to the platform, and the subscription identifier is used to look up the subscription transfer object. Then, only the identified subscription transfer object is transferred over to a new subscription for the recipient. Any other information required, e.g. billing details, is obtained from the recipient as needed to complete the new subscription order. Because the subscription transfer object is now associated with the new subscription in memory, the gift recipient's subscription information may be automatically and seamlessly transferred.

In some embodiments, there is provided a computer-implemented method. The method includes a step of storing, in memory, first subscription data for a subscription purchased online for a subscription recipient. The first subscription data may include data specific to the subscription recipient. The method may then involve associating the first subscription data with a subscription identifier in the memory. The computer-implemented method may further include a step of issuing, for use by the subscription recipient, the subscription identifier and a subscription continuation invitation. The method may further involve receiving, from a user device associated with the subscription recipient, an electronic message providing the subscription identifier. The method may then include retrieving, using the subscription identifier, the first subscription data from the memory. The method may also include a step of storing second subscription data in the memory, the second subscription data including data based on the first subscription data and additional information from the subscription recipient.

In some embodiments, the issuing step of the computer-implemented method may include transmitting an email including a hyperlink including the subscription identifier. In some embodiments, the electronic message may be a request corresponding to following the hyperlink.

In some embodiments, the hyperlink may be a uniform resource locator (URL) having the subscription identifier.

In some embodiments, the electronic message may be a hypertext transfer protocol (http) request or a hypertext transfer protocol secure (https) request.

In some embodiments, the issuing step of the computer-implemented method may include generating a quick response (QR) code encoding a URL. The URL may provide the subscription identifier. In the method, receiving the electronic message may include receiving a communication based on the URL encoded in the QR code.

In some embodiments, the subscription continuation invitation and the subscription identifier are issued at a defined time in relation to expiry of the subscription.

In some embodiments, the first subscription data may include at least one of: a selected subscription service; a time at which the subscription expires or automatically renews; a frequency at which a package is shipped to the subscription recipient; a restriction associated with the subscription; feedback or a preference provided by the subscription recipient; a shipping address; or, an indication of one or more previous packages shipped to the subscription recipient.

In some embodiments, the computer-implemented method may include, at one or more points prior to the issuing, updating the first subscription data to modify the data specific to the subscription recipient.

In some embodiments, the computer-implemented method may include generating web content that may include at least some of the first subscription data, and transmitting the web content for display on the user device.

In some embodiments, the generating the web content for display on the user device may further include generating a message for inclusion in the web content. The message may prompt the subscription recipient to perform at least one of: confirming at least some data included in the first subscription data; or, providing the additional information to be stored in the second subscription data.

In some embodiments, the method may further include a step of receiving a response from the user device. The response may provide at least one of: confirmation of the at least some data included in the first subscription data, or the additional information. The method may also include subsequently transmitting, to the user device, further web content including an order confirmation message. The order confirmation message may confirm establishment of the second subscription data.

A system is also disclosed that is configured to perform the methods disclosed herein. For example, the system may include a memory to store first subscription data and at least one processor to directly perform (or instruct the system to perform) the method steps.

In another embodiment, there is provided a computer readable medium having stored thereon computer-executable instructions that, when executed by a computer, cause the computer to the perform operations of the methods disclosed herein.

BRIEF DESCRIPTION OF THE DRAWINGS

Embodiments will be described, by way of example only, with reference to the accompanying figures wherein:

FIG. 2 illustrates a home page of an administrator, according to one embodiment.

FIGS. 5 and 6 illustrate examples of data stored in a subscription order, according to some embodiments;

FIG. 7 illustrates an example user interface providing a purchaser with a checkout page of an online purchase for a gift subscription, according to one embodiment;

FIGS. 9 and 10 illustrate example user interfaces provided to a recipient for continuation of a gifted subscription, according to some embodiments;

FIG. 11 illustrates an example of data stored in a second subscription order, according to one embodiment; and, FIG. 12 illustrates steps of a computer-implemented method, according to one embodiment.

DETAILED DESCRIPTION

For illustrative purposes, specific example embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
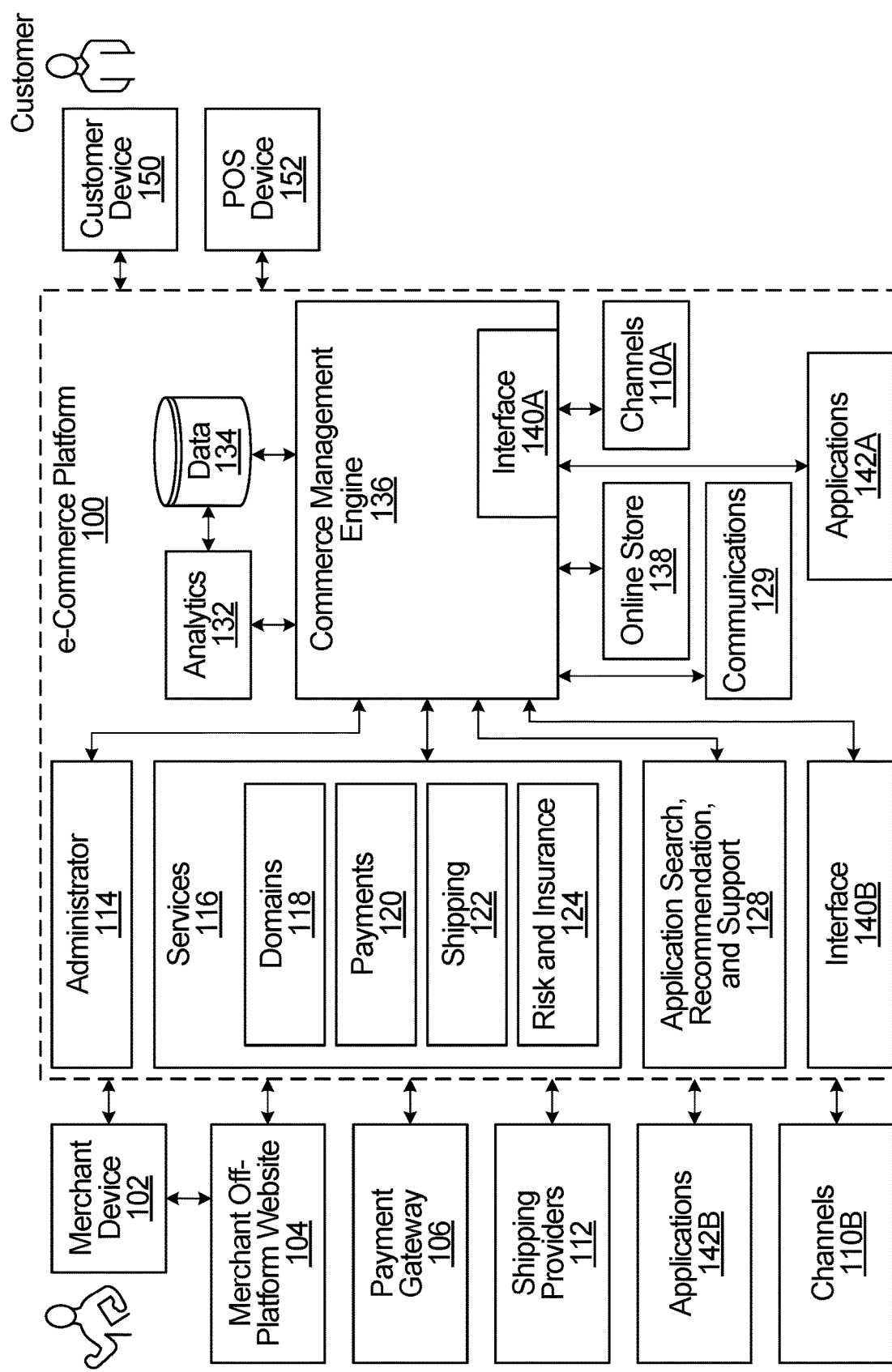
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Generating Subscription Orders in the e-Commerce Platform 100

A user may interact with e-commerce platform 100, such as with online store 138 or an online marketplace on the e-commerce platform 100, to purchase a subscription service as a gift for a gift recipient. The user will be referred to as the purchaser, and the gift recipient will be referred to as the recipient. In one example, the online store 138 or online marketplace is associated with a merchant having a merchant account on the e-commerce platform 100. The gift subscription may include different items in each package shipped to the recipient, and the items selected as part of the package may be determined in part based on information specific to the recipient. After a predefined length of time, the gift subscription ends. However, the recipient may wish to renew the subscription, and continue receiving packages from where they left off in the original gift subscription. "Renewing the subscription" may be used interchangeably herein with "continuing the subscription", referring to the gift recipient's continuation of the gift subscription after the gift subscription ends. For example, the recipient might not want to receive duplicate items, and may want for the contents of the package to take into account the previously known information specific to the recipient.

Figure 3:
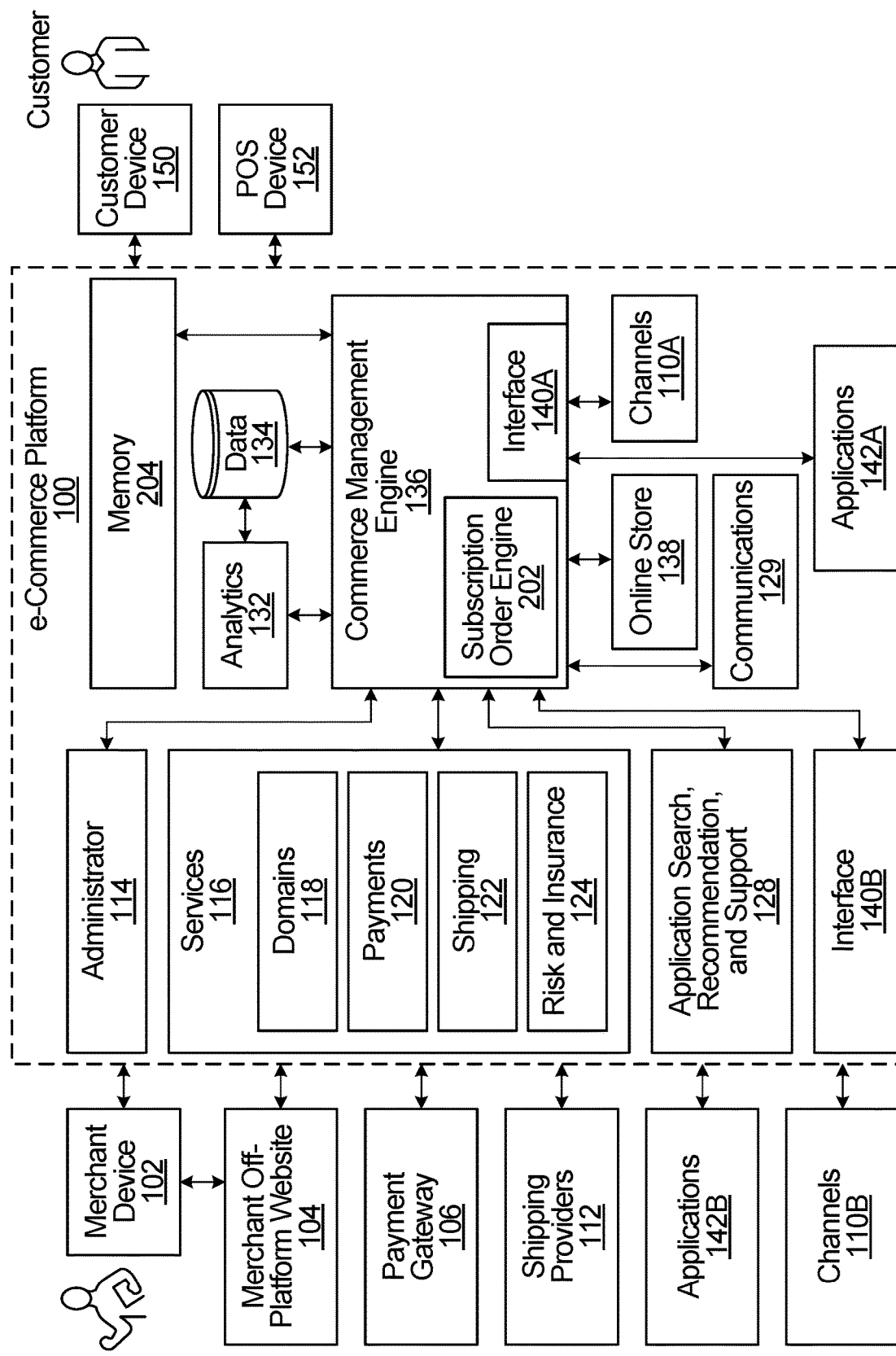
FIG. 3 illustrates the e-commerce platform of FIG. 1, but with a memory and a subscription order engine.

FIG. 3 illustrates the e-commerce platform 100 of FIG. 1, but with the additions of a subscription order engine 202 and a memory 204. The subscription order engine 202 may be embodied as part of the commerce management engine 136. The subscription order engine 202 performs the subscription ordering and transferring methods disclosed herein. For example, the subscription order engine 202 may issue the subscription identifier to the subscription recipient in the manner described herein. The subscription order engine 202 may also provide output based on the first subscription order and a second subscription order, e.g. as described herein. The subscription order engine 202 may be implemented by one or more general-purpose processors that execute instructions stored in a memory (e.g. in memory 204) or stored in another non-transitory computer-readable medium. The instructions, when executed, cause the subscription order engine 202 to perform the operations of the subscription order engine 202, e.g., operations relating to the storing of the first subscription order in memory for a subscription service purchased in an online store 138 or online marketplace, and the subsequent transfer, to the recipient, of the subscription identifier and some of the information stored in the first subscription order. Alternatively, some or all of the subscription order engine 202 may be implemented using dedicated circuitry, such as an application specific integrated circuit (ASIC), a graphics processing unit (GPU), or a programmed field programmable gate array (FPGA). In some embodiments, the subscription order engine 202 may be located inside the e-commerce platform 100 but external to, and coupled to, the commerce management engine 136. In some embodiments, the subscription order engine 202 may instead be located externally to the e-commerce platform 100 and possibly coupled to the commerce management engine 136.

The memory 204 of the e-commerce platform 100 of FIG. 3 may contain data in the form of a first subscription order, which may store information specific to a purchaser of a gift subscription and information relating to the recipient of a gift subscription. The memory 204 may further include a second subscription order created by the subscription order engine 202 in the manner described herein. In some embodiments, the memory 204 may be part of subscription order engine 202. In some embodiments, the memory 204 may be external to the e-commerce platform 100, and coupled to either the e-commerce platform 100 or the commerce management engine 136. In some embodiments, the data 134 may be stored in the memory 204.

Although the subscription order engine 202 in FIG. 3 is illustrated as a distinct component of the e-commerce platform 100 in commerce management engine 136, this is only an example. The subscription order engine 202 could also or instead be provided by another component residing within or external to the e-commerce platform 100. In some embodiments, either or both of the applications 142A-B may provide a subscription order engine that implements the functionality described herein. The location of the subscription order engine 202 is implementation specific. In some implementations, the subscription order engine 202 is provided at least in part by an e-commerce platform, either as a core function of the e-commerce platform or as an application or service supported by or communicating with the e-commerce platform.

In some embodiments, at least a portion of subscription order engine 202 could be implemented in a purchaser device or recipient device (e.g. customer device 150). For example, the customer device 150 could store and run at least some of the subscription order engine 202 locally as a software application.

Although the embodiments described herein may be implemented using the subscription order engine 202 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, but might instead be implemented as a standalone component or service. Therefore, the embodiments below will be described more generally.

Example System for Generating and Transferring Subscription Orders

Figure 4:
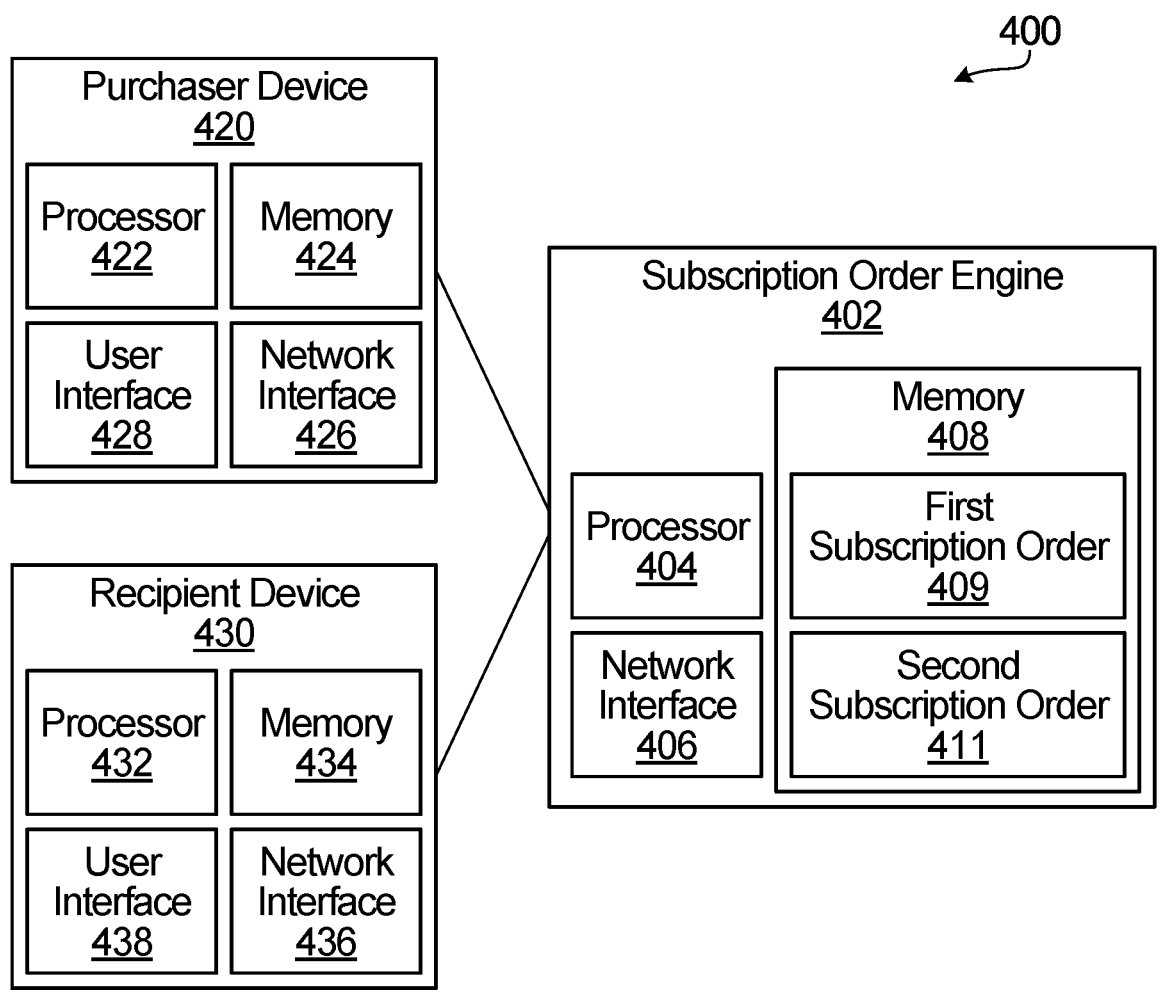
FIG. 4 illustrates a system for transferring subscription order information, according to one embodiment.

FIG. 4 illustrates a system 400 for storing subscription orders and transferring subscription order information, according to one embodiment. The system 400 includes a subscription order engine 402, a purchaser device 420, and at least one recipient device. Only a single recipient device 430 is illustrated.

The subscription order engine 402 may be a part of an e-commerce platform, e.g. e-commerce platform 100. The subscription order engine 402 of system 400 includes a processor 404 and a network interface 406. The processor 404 directly performs, or instructs the subscription order engine 402 to perform, the operations described herein of the subscription order engine 402, e.g., operations such as storing a first subscription order 409 that includes data provided by the purchaser device 420, transmitting a subscription continuation invitation and a subscription identifier to the recipient device 430, receiving and storing second subscription information from the recipient device 430, etc. The processor 404 may be implemented by one or more general purpose processors that execute instructions stored in a memory (e.g. in memory 408) or stored in another computer-readable medium. The instructions, when executed, cause the processor 404 to directly perform, or instruct the subscription order engine 402 to perform the operations described herein. In other embodiments, the processor 404 may be implemented using dedicated circuitry, such as a programmed FPGA, a GPU, or an ASIC.

The network interface 406 is for communicating over a network, e.g. to communicate with the purchaser device 420 and/or recipient device 430. The network interface 406 may be implemented as a network interface card (NIC), and/or a computer port (e.g. a physical outlet to which a plug or cable connects), and/or a network socket, etc., depending upon the implementation.

The subscription order engine 402 further includes a memory 408. A single memory 408 is illustrated in FIG. 4, but in implementation the memory 408 may be distributed. The memory 408 may include a first subscription order 409 and a second subscription order 411, which will be described in more detail later.

In some embodiments, the subscription order engine 402 may be implemented inside of an e-commerce platform, e.g. inside e-commerce platform 100. In some embodiments, the processor 404, memory 408, and/or network interface 406 may be located outside of the subscription order engine 402.

A plurality of purchasers may communicate with (e.g. access) the subscription order engine 402 over a network using purchaser devices. For example, a purchaser may use purchaser device 420 to input information relating to a subscription service being ordered online, e.g. shipping information of the recipient and billing information of the purchaser. The purchaser device 420 may be a mobile device (e.g. a smartphone, laptop, tablet), a desktop computer, an augmented reality (AR) device, etc., depending upon the implementation. The purchaser device 420 includes a processor 422, a memory 424, a user interface 428, and a network interface 426. The processor 422 directly performs, or instructs the purchaser device 420 to perform, the operations of the purchaser device 420 described herein, e.g. enabling the purchaser to enter, via the use of user interface 428, information that is stored as part of the first subscription order 409, associated with the purchase of a subscription service. The processor 422 may be implemented by one or more general purpose processors that execute instructions stored in a memory (e.g. memory 424) or stored in another computer-readable medium. The instructions, when executed, cause the processor 422 to directly perform, or instruct the purchaser device 420 to perform, the operations described herein. In other embodiments, the processor 422 may be implemented using dedicated circuitry, such as a programmed FPGA, a GPU, or an ASIC.

The user interface 428 may be implemented as a display screen (which may be a touch screen), and/or a keyboard, and/or a mouse, etc., depending upon the implementation. The network interface 426 is for communicating with the subscription order engine 402 over the network. The structure of the network interface 426 will depend on how the purchaser device 420 interfaces with the network. For example, if the purchaser device 420 is a mobile phone, laptop, or tablet, the network interface 426 may comprise a transmitter/receiver with an antenna to send and receive wireless transmissions to/from the network. If the purchaser device 420 is a personal computer connected to the network with a network cable, the network interface 426 may comprise a NIC, and/or a computer port (e.g. a physical outlet to which a plug or cable connects), and/or a network socket, etc.

One or more users may access the subscription order engine 402 over a network using recipient devices, e.g. to be provided with a subscription identifier and a subscription continuation invitation, and to enter additional information that is to be stored as part of a second subscription order 411 (e.g., through the use of a web content, the recipient may enter information such as their billing information). For ease of explanation, only a single recipient device 430 is illustrated in FIG. 4. The recipient device 430 may be a mobile device (e.g. a smartphone, laptop, tablet), a desktop computer, an AR device, etc., depending upon the implementation. The recipient device 430 includes a processor 432, a memory 434, a user interface 438, and a network interface 436. The processor 432 directly performs, or instructs the recipient device 430 to perform, the operations of the recipient device 430 described herein, e.g. providing, through the user interface 438, web content that allows a recipient to enter information needed to continue a gift subscription. The processor 432 may be implemented by one or more general purpose processors that execute instructions stored in a memory (e.g. memory 434) or stored in another non-transitory computer-readable medium. The instructions, when executed, cause the processor 432 to directly perform, or instruct the recipient device 430 to perform, the operations described herein. In other embodiments, the processor 432 may be implemented using dedicated circuitry, such as a programmed FPGA, a GPU, or an ASIC.

The user interface 438 may be implemented as a display screen (which may be a touch screen), and/or a keyboard, and/or a mouse, etc., depending upon the implementation. The network interface 436 is for communicating with the subscription order engine 402 over the network. The structure of the network interface 436 will depend on how the recipient device 430 interfaces with the network. For example, if the recipient device 430 is a mobile phone, laptop, or tablet, the network interface 436 may comprise a transmitter/receiver with an antenna to send and receive wireless transmissions to/from the network. If the recipient device 430 is a personal computer connected to the network with a network cable, the network interface 436 may comprise a NIC, and/or a computer port (e.g. a physical outlet to which a plug or cable connects), and/or a network socket, etc.

In some embodiments, the subscription order engine 402 is part of an e-commerce platform, e.g. e-commerce platform 100. For example, the subscription order engine 402 may be subscription order engine 202 illustrated in FIG. 3. However, this is not necessary. The subscription order engine 402 may, for example, instead be provided by another component of an e-commerce platform or implemented as a stand-alone component or service that is external to an e-commerce platform. In other embodiments, the subscription order engine 402 may be implemented on or in association with a computer system that is not an e-commerce platform. In some embodiments, some operations of the subscription order engine 402 described herein could potentially be implemented in part on/by purchaser device 420 and/or recipient device 430.

Operation of the subscription order engine 402 will now be described in the context of example embodiments.

A purchaser may use their purchaser device 420 to navigate to an online platform to purchase a subscription service. The online platform may host subscription order engine 402. During the online checkout process, the purchaser may use their purchaser device 420 to provide information required for the subscription service, such as the length of the subscription, payment method, billing details, the purchaser's electronic contact information (e.g. the purchaser's email address), and the shipping address. The purchaser may indicate that the subscription service is a gift and optionally provide the electronic contact information (e.g. email address) of the gift recipient.

Figure 5:
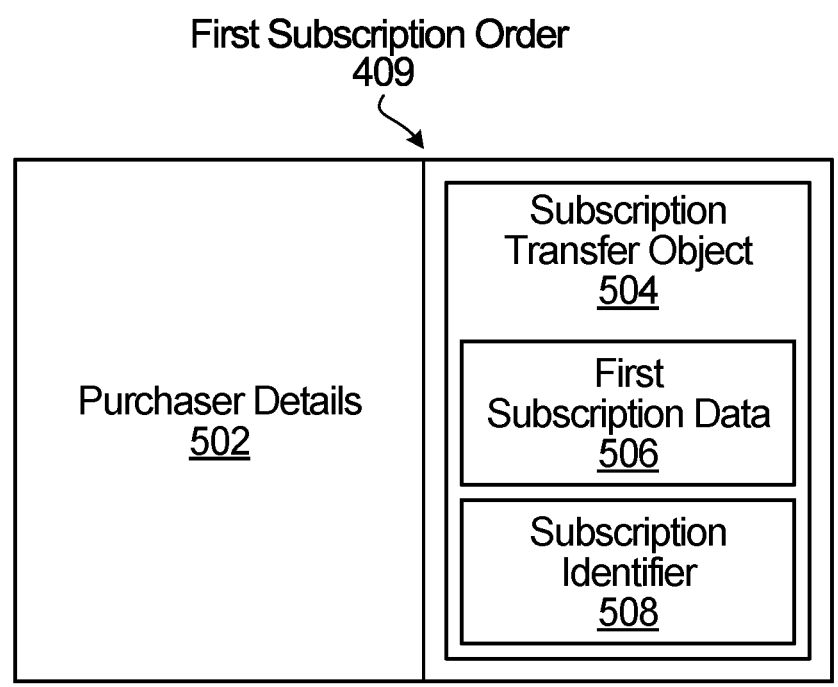

The subscription order engine 402 generates a first subscription order 409 in memory 408 in association with the purchased subscription service. FIG. 5 provides an example of data stored in the first subscription order 409, according to an embodiment. The first subscription order 409 includes two decoupled partitions of data in memory: (1) purchaser details 502, and (2) a subscription transfer object 504. The purchaser details 502 include all information personal to the purchaser that is required for the subscription order, e.g. the purchaser's billing address and payment details. The subscription transfer object 504 includes all information specific to the recipient receiving the subscription, which may collectively be considered to be first subscription data 506. The subscription transfer object 504 may also be assigned a subscription identifier 508, described later herein. No personal details relating to the purchaser are provided in the subscription transfer object 504. The personal details relating to the purchaser are instead stored as part of the purchaser details 502.

In one example, the subscription transfer object 504 includes first subscription data 506 that indicates:

The specific service selected (e.g. which may determine quantity of products in each package and/or the price).
When the subscription service expires or auto-renews.
The frequency at which a package is shipped, e.g. once a month.
Restrictions associated with the subscription, e.g. allergies of the recipient.
Past feedback and/or preferences provided by the recipient.
An indication of the previous packages already shipped.
A shipping address of the recipient.

The subscription transfer object 504 may also include additional meta-information relating to the subscription throughout its entire lifetime. This may include information that can be used, for example, to determine when a subscription order is transferred or the duration of the time period for which the order was a gift. For example, the subscription may have initially begun as a gift subscription, but, after the gift recipient has continued the subscription, it might not be considered a gift anymore, which may be reflected in the meta-information.

The exact way in which the information above is indicated in the subscription transfer object 504 is implementation specific. For example, the indication of the previous packages already shipped may be implemented by storing a list of products previously sent, or instead by storing the next package number to be shipped, e.g. if the subscription service is implemented by the merchant as a series of consecutive curated packages, each having a respective number in the series.

The subscription identifier 508 is a unique ID in memory 408 that is linked to the subscription transfer object 504, and that uniquely identifies and distinguishes the subscription transfer object 504 from other subscription transfer objects for other orders that may be stored in memory 408.

As an example, a purchaser, John Buck, may purchase a subscription service for a recipient, Jane Doe, from the online retailer "TreatTote". The subscription service may be a box of snack food products that is delivered to the recipient on a recurring basis.

FIG. 6 provides an example of data stored in the first subscription order 409, according to a particular embodiment. The first subscription order 409 shown in FIG. 6 is the subscription order for the subscription service purchased by John Buck for Jane Doe from TreatTote. The first subscription order 409 is shown as a table in the memory 408. The table provides the purchaser details 502 and the information within the subscription transfer object 504, including the first subscription data 506 and the subscription identifier 508. The table includes: a column 602 including the stored information; a column 604 associating a label with each piece of information in column 602; a column 606 that indicates the date that the information was added to the first subscription order 409; and, a column 608 that includes, if applicable, the subscription identifier 508 associated with the information.

For instance, the first row in the first subscription order 409 of FIG. 6 includes the information "123 Main Street, New York, N.Y., USA, 10001". This is indicated to be the billing address associated with John Buck, and would be stored as part of the purchaser details 502. The billing address of the purchaser was added to the first subscription order 409 on 2020 Dec. 20, which is the time at which the subscription service was purchased.

The sixth row in the first subscription order 409 of FIG. 6 includes the information "One box per month", which is the subscription frequency at which a package is delivered to the recipient. The subscription frequency is stored in memory 408 as part of the first subscription data 506 within the subscription transfer object 504. As well, the third column 606 of the table indicates that the subscription frequency was stored as part of the first subscription order 409 on 2020 Dec. 20, which is the date that the subscription service was purchased. The fourth column 608 indicates that the subscription frequency is part of the subscription transfer object 504, as it is tagged with a subscription identifier 508: "AX4C8NjqR753bL"

In some embodiments, the data in the subscription transfer object 504 is kept up-to-date as the subscription progresses, and is relied upon to fulfill the subscription. For example, if the recipient indicates a restriction or preference or a new mailing address, this is updated in the subscription transfer object 504. As another example, upon shipment of a package, the subscription transfer object 504 is updated to indicate the next package to ship.

For example, in FIG. 6, the last four rows of the table are entries that have been added to the first subscription order 409 following the purchase of the subscription service. This is indicated by the dates in the third column 606 for these rows being later than the date listed in the previous rows. For instance, on 2021 Feb. 1, an indication that the second box of the subscription service was sent to the recipient was recorded in the first subscription data 506. After receiving the second shipment box, the recipient, Jane Doe, provided an indication to TreatTote on 2021 Feb. 16 that she favors coconut flavored snack foods, such that more coconut flavored snack foods may be included in future boxes sent as part of the subscription service. In some embodiments, this indication may be provided to the subscription order engine 402 via an electronic message, e.g. via an email or website feedback form transmitted from Jane Doe's device (recipient device 430). In an alternative implementation, this indication may be provided to the merchant based on a mail-in feedback form and manually entered by the merchant to provide it to the subscription order engine 402. In another implementation, the indication may be provided via an application programming interface (API). The first subscription data 506 may be updated to include this indication of a preference for coconut flavored snack foods, which may be tagged with the subscription identifier 508: "AX4C8NjqR753bL". In some embodiments, the indication may be associated with the subscription identifier 508 (e.g. the indication may be transmitted from Jane Doe's device in a message that also includes the subscription identifier 508). This association may allow for the subscription order engine 402 to add the indication to the correct subscription order.

The data structures provided by FIGS. 5 and 6 are only illustrative examples of data structures that may be used to store the first subscription order 409 in the memory 408. The data stored as part of the first subscription order 409 may be stored in different types of data structures, or in any manner that allows the first subscription order 409 data to be accessed as required.

Near the end of the gift subscription, the subscription identifier 508 is issued to the recipient (Jane Doe in the example above), along with an invitation for the recipient to continue the subscription. A few example different ways to issue the subscription identifier to the recipient are as follows.

If the electronic contact information (e.g. email address) of the recipient is known, then the subscription identifier 508 may be provided in an electronic message (e.g. email) to the recipient. The purchaser may also be notified, e.g. a single email sent to the email address of the recipient copying the purchaser. In one implementation, the email includes a hyperlink having a uniform resource locator (URL) that includes the subscription identifier 508, e.g. the subscription identifier 508 as a file, path, parameter, or fragment in the URL. Upon selecting the hyperlink, a hypertext transfer protocol (http) request or a hyperlink transfer protocol secure (https) request is sent to the subscription order engine 402 to prompt creation of a new subscription order. The subscription identifier 508 is provided in the http or https request. The subscription identifier 508 is extracted from the http or https request and used to obtain the subscription transfer object 504, e.g. via a lookup table.

In some embodiments, if the electronic contact information (e.g. email address) of the recipient is not known, then the subscription identifier 508 may instead be provided in an electronic message (e.g. email) to the purchaser, to be forwarded on to the recipient, as the purchaser wishes.

In some embodiments, the subscription identifier 508 may be mailed to the recipient, e.g. included in the last shipped package of the gifted subscription. In some of such embodiments, the subscription identifier 508 is embedded in a machine-readable code. For example, the subscription identifier 508 may be part of a URL embedded in a quick response (QR) code. The QR code may be read by a QR code scanner or reader on the recipient device 430 to cause a request (e.g. http or https request) to be sent to the subscription order engine 402.

A combination of the methods above may be employed. For example, if the electronic contact information of the recipient is not known, an email may be sent to the purchaser and a machine-readable code (e.g. QR code) may be mailed to the recipient if the email is unsuccessful in prompting the transfer of the gift subscription. Also, the URL-based method described above is only an example. Alternative methods could include the recipient manually entering the subscription identifier 508, e.g. when interacting with the merchant's online store or marketplace to generate a new subscription order, or the subscription identifier 508 being automatically transferred in or to the subscription order engine 402 via the prompting of electronic messages in an app (e.g. if the recipient is registered with and uses an app associated with the subscription order engine 402).

Assuming the recipient provides the subscription identifier 508 to the subscription order engine 402 in association with a new subscription order, then the subscription order engine 402 does not create a new subscription transfer object, but instead uses the subscription transfer object 504 obtained via the subscription identifier 508. The term "new subscription order" used herein may refer to the continuation or a renewal of the gift subscription service by the gift recipient.

The first subscription data 506 in the subscription transfer object 504 is transferred over to the new subscription order. The new subscription order will be referred to as a second subscription order 411. This allows for the details and progress of the subscription service to seamlessly continue between the gifted subscription service (the first subscription order 409) and the new subscription service (the second subscription order 411).

In some embodiments, during the creation of the second subscription order 411 by the recipient, some or all of the information in the subscription transfer object 504 may be presented on a display of the recipient device 430 (e.g. in the form of web content), possibly with the option for the recipient to confirm or modify some or all of the information. For example, if the subscription transfer object 504 includes information relating to length of the subscription and auto-renewal rules, this may be surfaced to the recipient for confirmation or modification.

In some embodiments, the recipient may be registered with an app associated with the subscription order engine 402 or merchant, and as a result there may already be billing information stored in relation to the recipient. Upon the recipient's authorization, the gift subscription may automatically transfer over to the recipient. For example, the subscription order engine 402 may know the gifted subscription is directed to the recipient and therefore near the end of the gifted subscription an electronic message may be sent to the recipient device 430 through the app to invite transfer of the subscription to the recipient. Upon receiving a confirmation message back from the recipient device 430, the new subscription order (i.e. the second subscription order 411) may be created for the recipient with the subscription transfer object 504 retrieved via the subscription identifier 508.

In some embodiments, the purchaser may be able to control whether or not the gift recipient is able to take ownership of the subscription order. In some embodiments, the subscription order engine 402 may provide a hand-off protocol. The hand-off protocol may include transmitting a hand-off message to the purchaser device 420, which may be displayed as a web content through the user interface 428. The web content may include a prompt for the purchaser to select whether or not they consent to allowing the gift recipient to continue the subscription order. The response to the prompt through the user interface 428 may provide an indication of hand-off consent, which may be transmitted to the subscription order engine 402 and stored as part of the first subscription order 409 in the memory 408. If a positive indication of hand-off consent is provided to the subscription order engine 402, the subscription identifier 508 and the subscription continuation invitation may be issued to the gift recipient. Alternatively, if a negative indication of hand-off consent is provided to the subscription order engine 402, the gift recipient might not be invited to continue the subscription order.

Example User Interfaces

When the purchaser is purchasing a subscription service online, the subscription order engine 402 may generate a web content that is displayed to the purchaser via the user interface 428 of the purchaser device 420. The web content may prompt the purchaser to provide information that is stored as part of the first subscription order 409 that is stored in memory 408.

FIG. 7 illustrates an example user interface providing a purchaser with a checkout page of an online purchase for a gift subscription. FIG. 7 shows web content 700 that is rendered as a checkout page of an online store, as shown on the purchaser device 420. In an example, the checkout page shows the purchaser, John Buck, entering necessary data in order to complete an order for a gift subscription service for Jane Doe. The checkout page includes fields for John Buck to enter purchaser information 502, which includes his billing address and billing information. As well, there is a checkbox 702 that allows John Buck to indicate whether the subscription service being purchased is a gift subscription. The information entered into remaining fields following the checkbox 702 is information particular to the recipient, and later form at least part of the first subscription data 506. Such fields shown on the checkout page 700 include: the recipient Jane Doe's shipping address (e.g., 1000 Oak Avenue, New York, N.Y., USA, 10002); electronic contact information for Jane Doe (e.g., her email address: jane_doe@examplemail.com); product preferences of Jane Doe (e.g., "chocolate"); and, product restrictions for Jane Doe's subscription boxes (e.g., "peanuts").

Once John Buck selects the "Check Out" button on the checkout page 700, John Buck may receive confirmation of purchase via the user interface 428 of his purchaser device 420. As well, the subscription order engine 402 may then generate a first subscription order 409 in memory 408. The first subscription order 409 may be stored in memory as a table, such as the table shown in FIG. 6. The fields of the checkout page 700 in which John Buck entered information particular to the recipient may be stored as first subscription data 506 and may be assigned the subscription identifier 508: "AX4C8NjqR753bL".

In some embodiments, the selection of the checkbox 702 indicating the purchase of a gift may cause the subscription order engine 402 to generate further web content with additional fields for the purchaser to fill out, e.g. fields for entering information related to the gift recipient.

Figure 8:
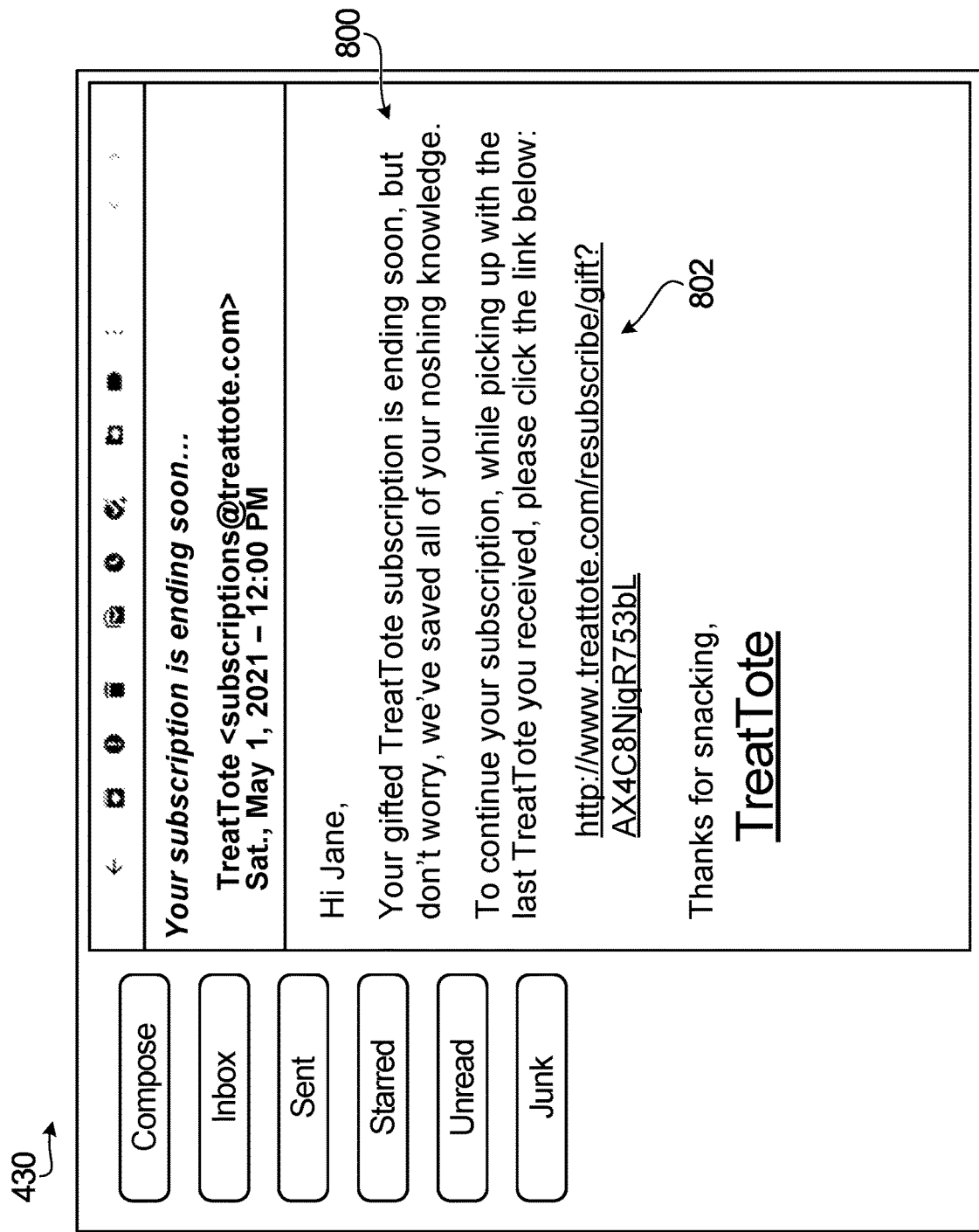
FIG. 8 illustrates an example user interface providing a recipient with a subscription continuation invitation, according to one embodiment.

FIG. 8 illustrates an example user interface providing a recipient with a subscription continuation invitation. In FIG. 8, an email 800 is provided to the recipient via the user interface 438 of the recipient device 430. The email 800 is sent from the subscription order engine 402, e.g. on behalf of the merchant, to the recipient at a defined time relative to the expiration of the gift subscription service. Alternatively, the email 800 may have been sent to the purchaser device 420 and forwarded by the purchaser to the recipient. In the illustrated example, the email 800 is sent by TreatTote to Jane Doe on May 1, 2021, which is one month prior to the expiration of the gift subscription service purchased for her by John Buck. The email 800 indicates that her subscription is ending soon, and that she is able to take ownership of the information of her gifted subscription for renewal (e.g., the subscription order engine 402 may create a new, i.e. second, subscription order 411 using the methods described herein, which may store the first subscription data 506). In some embodiments, the email 800 may instead be sent or re-sent upon and/or after expiry of the gifted subscription.

The email text prompts Jane Doe to click a provided hyperlink 802. The hyperlink 802 is the following URL: "http://www.treattote.com/resubscribe/gift?AX4C8NjqR753bL". The URL includes the subscription identifier 508 "AX4C8NjqR753bL" that is associated with the first subscription data 506 in memory 408. If Jane Doe clicks on the hyperlink 802, the subscription order engine 402 is provided with the subscription identifier 508, e.g. the subscription identifier 508 is included in a request (e.g. an http or https request) sent in response to clicking the hyperlink. The request may instruct the processor 404 to retrieve the first subscription data 506 within the subscription transfer object 504.

FIGS. 9 and 10 illustrates example user interfaces provided to a recipient for continuation of a gifted subscription. After clicking on the hyperlink 802 provided in the email 800 of FIG. 8, the subscription order engine 402 may generate a web content, such as web page 900, to provide to the recipient via the user interface 438 of the recipient device 430.

FIG. 9 includes a web page 900 that includes web content 902 for a recipient to provide information required for creating a new subscription order (e.g., the second subscription order 411 in memory 408). For example, web page 900 may be a web page provided to Jane Doe by the subscription order engine 402 (on behalf of TreatTote) after clicking on hyperlink 802. The web page 900 includes the web content 902 allowing for Jane Doe to enter her billing address and billing information for inclusion in the second subscription order 411.

During the creation of the second subscription order 411, the purchaser details 502 of the purchaser of the gift subscription will not be retrieved by the subscription order engine 402, as the purchaser details 502 are not associated with the subscription identifier 508. As TreatTote requires particular information (e.g., billing information) in order to provide the subscription service, this information is obtained from the gift recipient via the recipient device 430 using web page 900.

In a further example, FIG. 10 provides web content 1000 on the web page 900 that is provided to the recipient device 430 after clicking on the hyperlink 802. The web content 1000 displays some of the information stored in the first subscription data 506, and allows the recipient to selectively confirm, remove, or add to the information. In FIG. 10, the web content 1000 displays product preference descriptors (e.g., "Chocolate" and "Coconut") stored in the first subscription data 506 that have been previously provided by John Buck and Jane Doe. The web content 1000 allows Jane Doe to de-select these stored preferences, or optionally add one or more product preference descriptors provided as a list. Some provided examples include: "Caramel", "Salty", "Licorice", "Mint", and "Crunchy".

In some embodiments, the web content 1000 may be provided on the same web page as web content 902. The web content 1000 may appear after the recipient enters information in the fields provided by web content 902, or vice versa. In other embodiments, the web content 1000 may be provided on a different web page than web content 902, which may be linked to the web page including web content 902. Either the web page including the web content 902 or the web content 1000 may be opened as a result of clicking on the hyperlink 802.

In some embodiments, web page 900 may also include other web content, which may prompt the recipient to select or confirm other information that may be particular to the subscription recipient or the subscription order. This may include other information that is part of the first subscription data 506. For example, the recipient may be prompted to confirm product restriction information for products sent in the packages as part of the subscription service. As another example, the recipient may be prompted to select a duration of the subscription service. When renewing her subscription, Jane Doe may wish to receive a monthly TreatTote box for twelve months, whereas the previous gift subscription had a duration of six months.

The interfaces provided in FIGS. 9 and 10 are only examples of the user interfaces that may be provided to the recipient device 430 by the subscription order engine 402. The interfaces are not limited to the appearance of the interfaces shown in FIGS. 9 and 10, and may be designed in any way that enables the recipient to provide recipient information and/or to selectively confirm information stored as part of the first subscription data 506.

Following the recipient's interaction with the web content 902 and 1000, the subscription order engine 402 may provide web content including confirmation of the second subscription order 411 to the recipient via the recipient device 430, e.g., on a web page provided to the recipient after entering the billing information or by email. The subscription order engine 402 may store the newly obtained data as part of the second subscription order 411 in the memory 408 as a table similar to the table of the first subscription order 506 in FIG. 6.

FIG. 11 illustrates an example of data stored in a second subscription order 411 in memory. The table includes second subscription data 1100. The second subscription data 1100 includes at least some of the information of the first subscription data 506 and additional information from the subscription recipient 1102.

The information of the first subscription data 506 that is part of the second subscription data 1100 may include some or all of the data obtained by the subscription order engine 402 from the subscription transfer object 504 after being provided with an electronic message including the subscription identifier 508. For example, the second row of the table in FIG. 11 includes the subscription service's shipping address: "1000 Oak Avenue, New York, N.Y., USA, 10002". This shipping address was previously stored as part of the first subscription data 506 in the first subscription order 409 (as shown in FIG. 6), but has been obtained by the subscription order engine 402 and stored as part of the second subscription data 1100, e.g., using the methods described herein. The row entry is still associated with the subscription identifier 508, and is still listed as being added to the memory on the date that John Buck purchased the original gift subscription service.

In some embodiments, the first subscription data 506 included as part of the second subscription data 1100 may be all of the first subscription data 506.

In another embodiment, the first subscription data 506 included as part of the second subscription data 1100 may include all of the first subscription data 506 except for information that has been explicitly de-selected when displayed to the recipient on a recipient device 430, as shown in FIG. 10.

In another embodiment, the first subscription data 506 included as part of the second subscription data 1100 might only include information that has been confirmed by the recipient via the recipient device 430, such as in the manner described in FIG. 10.

The additional information from the subscription recipient 1102 may be information that is provided by the recipient via the recipient device 430 after the second subscription order 411 has been created by the subscription order engine 402. This may include new information that was entered via the user interfaces of FIGS. 9 and 10. For example, Jane Doe may provide her billing information to the subscription order engine 402 via the web content 902 of FIG. 9, and the billing information may be added to the table of FIG. 11 as additional information from the subscription recipient 1102.

As another example, Jane Doe may select the product preference "Crunchy" while interacting with the web content 1000 in FIG. 10. The product preference information may be added to the second subscription data 1100 in memory 408. This entry is shown in the last row of the table of FIG. 11 as part of the additional information from the subscription recipient 1102. This entry is not shown to be associated with the subscription identifier 508, as it is added as additional information 1102 by Jane Doe after the subscription transfer object 504 has already been obtained and the first subscription data 506 has already been added as part of the second subscription data 1100. Alternatively, the product preference "Crunchy" and/or the twelve month subscription indication may be added to the subscription transfer object 504 and/or associated with the subscription identifier 508.

Example Methods

Figure 12:
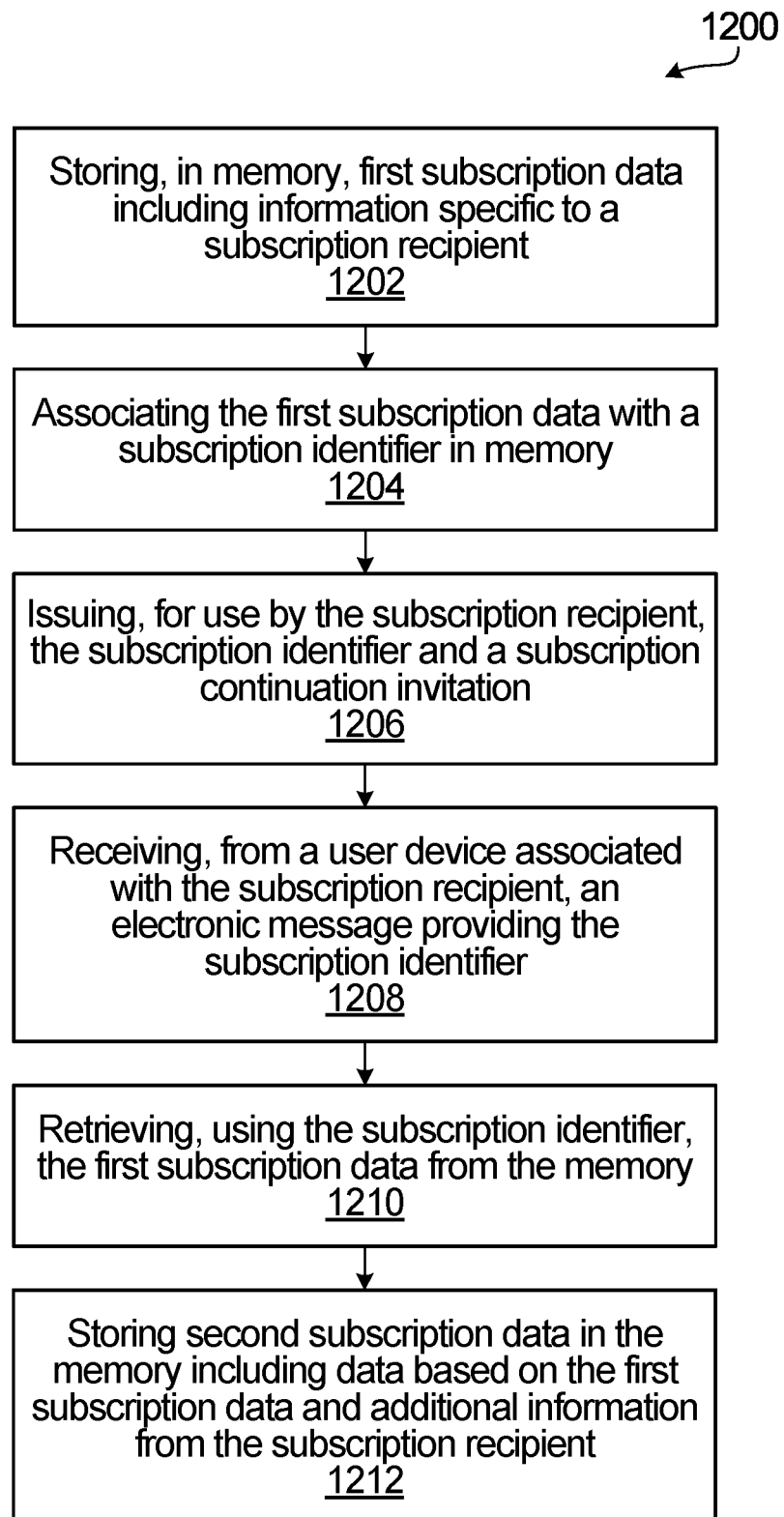

FIG. 12 illustrates a computer-implemented method 1200, according to one embodiment. Not all of the steps in the method 1200 of FIG. 12 are necessary in all embodiments. Also, some of the steps may be substituted by other steps instead, and/or one or more of the steps may be combined. The method may be performed by or on an e-commerce platform, such as e-commerce platform 100, although this is not necessary. In method 1200, the steps are described as being performed by the processor 404 of subscription order engine 402 of FIG. 4, but this is only an example. For example, the method 1200 may instead be performed by another entity, which might or might not be part of an e-commerce platform.

At step 1202, first subscription data 506 for a subscription purchased online for a subscription recipient is stored in memory 408. The first subscription data 506 may include data specific to the subscription recipient. For example, John Buck may purchase a snack food box subscription service online for Jane Doe, and the subscription order engine 402 may store a first subscription order 409 in memory 408. The first subscription order 409 may include first subscription data 506, such as Jane Doe's shipping address, "1000 Oak Avenue, New York, N.Y., USA, 10002", and snack preferences, "Chocolate", as shown in FIG. 6. In some embodiments, the first subscription data 506 may be stored within an object in the memory 408. For example, the first subscription data 506 may be stored in the subscription transfer object 504 described earlier.

At step 1204, the first subscription data 506 is associated with a subscription identifier 508 in memory 408. In FIG. 5, the first subscription order 409 is shown to include a subscription transfer object 504 including the first subscription data 506 and the subscription identifier 508. As an example, FIG. 6 shows the alpha-numeric subscription identifier "AX4C8NjqR753bL" associated with data specific to Jane Doe, the recipient, in the table stored in memory 408. The row storing Jane Doe's shipping address includes a column having the subscription identifier 508.

At step 1206, the processor 404 issues, for use by the subscription recipient, the subscription identifier 508 and a subscription continuation invitation. The subscription order engine 402 may issue the subscription identifier 508 and the subscription continuation invitation to a subscription service recipient in a plurality of manners, as described above. For example, as John Buck provided Jane Doe's electronic contact information to the subscription order engine 402 when purchasing the gift subscription service, the subscription order engine 402 may send the subscription continuation invitation to Jane Doe via email. An example of the email 800 Jane Doe may receive is shown in FIG. 8, which includes a hyperlink 802 to web content that allows Jane Doe to continue the gift subscription. The hyperlink 802 "http://www.treattote.com/resubscribe/ gift?AX4C8NjqR753bL" includes the subscription identifier 508 "AX4C8NjqR753bL" that was previously assigned to the first subscription data 506.

At step 1208, the processor 404 receives, from a user device associated with the subscription recipient, an electronic message providing the subscription identifier 508. The user device associated with the subscription recipient may be recipient device 430 shown in FIG. 4. The recipient device 430 may provide the subscription order engine 402 with an electronic message, which may be a communication (e.g. a request, such as a http or https request) based on a URL in an email or a QR code sent to the recipient.

At step 1210, the processor 404 retrieves, using the subscription identifier 508, the first subscription data 506 from the memory 408. For example, the subscription identifier 508 may be provided to the subscription order engine 402 through the recipient using the recipient device 430 to open a hyperlink with the subscription identifier 508 in the URL, thereby causing a request, such as an http or https request, to be sent from the recipient device 430, where the request includes the subscription identifier 508. In another example, the recipient may use recipient device 430 to manually enter the subscription identifier in an interaction with a merchant's online store or the subscription order engine 402. Then, the subscription order engine 402 may use the subscription identifier 508 to look up and thereby obtain the subscription transfer object 504 in the first subscription order 409. The subscription transfer object 504 associated with the subscription identifier 508 includes first subscription data 506. In an example, after Jane Doe clicks on the hyperlink 802 in email 800 shown in FIG. 8, the subscription order engine 402 may retrieve the first subscription data 506 of the subscription transfer object 504 having the subscription identifier 508 "AX4C8NjqR753bL", including the data found in the rows of the table of FIG. 6 tagged with this identifier.

At step 1212, second subscription data 1100 is stored in the memory 408. The second subscription data 1100 may include data based on the first subscription data 506 and additional information from the subscription recipient 1102. The second subscription data 1100 may be stored in the new subscription order described earlier. The new subscription order may be a continued subscription order, e.g. an order that continues the original subscription service purchased by the purchaser, but is now associated with the recipient instead of the purchaser.

For example, Jane Doe may select the hyperlink 802 in the email 800 of FIG. 8, and based on the request sent to the subscription order engine 402 in response to the hyperlink 802 being clicked, the subscription order engine 402 may create a second subscription order 411 in the memory 408. The second subscription order 411 may store information found in the subscription transfer object 504, including the first subscription data 506 associated with the subscription identifier 508 shown in FIG. 6 (such as Jane Doe's shipping address). The second subscription order 411 may also include additional information 1102 entered by Jane Doe using her recipient device 430. For instance, Jane Doe may enter her billing information in the web content 902 of FIG. 9 and update her snack food preferences by interacting with the web content 1000 of FIG. 10. This is stored as additional information 1102 as part of a table in memory 408 that includes second order data 1100, as shown in FIG. 11.

In some embodiments, the issuing in step 1206 includes transmitting an email including a hyperlink including the subscription identifier 508. The electronic message of step 1208 may be a request corresponding to following the hyperlink. For example, Jane Doe receives an email 800 to her recipient device 430 in FIG. 8. The content of the email includes a subscription continuation invitation, which states that her subscription service is ending soon, and requests that she clicks on hyperlink 802 to continue her gift subscription service to TreatTote. The hyperlink 802 includes the subscription identifier 508: "AX4C8NjqR753bL". When the hyperlink is selected, the recipient device 430 transmits an electronic message including the subscription identifier 508.

In some embodiments, the hyperlink is a URL having the subscription identifier 508. For example, the hyperlink 802 in FIG. 8 is the URL "http://www.treattote.com/resubscribe/gift?AX4C8NjqR753bL", which includes the subscription identifier 508: "AX4C8NjqR753bL".

In some embodiments, the electronic message of step 1208 is a http request or a https request. In some embodiments, the http or https request may be based on a URL. In some embodiments, the URL may encoded in a QR code. In other embodiments, the URL may be in an email, e.g. as a hyperlink. For example, the electronic message from the recipient device 430 may be an http or https request that is provided to the subscription order engine 402.

In some embodiments, the issuing in step 1206 may include generating a QR code encoding a URL. The URL may provide the subscription identifier 508. The receiving the electronic message in step 1208 may include receiving a communication based on the URL encoded in the QR code.

For example, electronic contact information for a subscription recipient might not be provided by a subscription purchaser at the time of purchase. Therefore, one example the subscription order engine 402 may generate a QR code to include in a package sent to the recipient that encodes a URL including the subscription identifier (such as the URL 802 in FIG. 8). The recipient may then use recipient device 430 to scan or read the QR code. Upon scanning or reading the QR code, the recipient device 430 is triggered to transmit a communication to the subscription order engine 402 based on the URL.

In some embodiments, in step 1206 the subscription continuation invitation and the subscription identifier 508 are issued at a defined time in relation to expiry of the subscription. The defined time may be prior to (in advance of) the expiry of the subscription, or after (subsequent to) the expiry of the subscription.

For example, the subscription order engine 402 may provide the subscription continuation invitation and the subscription identifier 508 to the recipient via the recipient device 430 at a particular time, which may be determined by the subscription order engine 402 or the merchant. For instance, the subscription invitation as shown in the email 800 of FIG. 8 may be sent to Jane Doe on May 1, 2021. The first subscription box of the gift subscription was shipped to Jane Doe five months earlier on Jan. 1, 2021, as shown in FIG. 6. As Jon Buck purchased a six month gift subscription, the subscription continuation invitation and the subscription identifier 508 are provided to Jane Doe one month prior to the expiry of the gift subscription.

In some embodiments, the first subscription data 506 includes at least one of: a selected subscription service; a time at which the subscription expires or automatically renews; a frequency at which a package is shipped to the subscription recipient; a restriction associated with the subscription; feedback or a preference provided by the subscription recipient; a shipping address; or, an indication of one or more previous packages shipped to the subscription recipient.

For example, the subscription order engine 402 includes the first subscription order 409 having a subscription transfer object 504. The subscription transfer object 504 includes the first subscription data 506. In the first subscription order 409 table of FIG. 6, examples of the first subscription data 506 include: the fifth row, which provides the subscription duration of "six month subscription"; the sixth row, which provides the subscription frequency of "One box per month"; the seventh row, which provides Jane Doe's shipping address as "1000 Oak Avenue, New York, N.Y., USA, 10002"; the ninth row, which provides a restriction in the form of an indication of Jane Doe's allergy to peanuts; and the tenth row, which provides an indication of Jane Doe's preference for snack foods including chocolate.

In some embodiments, at one or more points prior to the issuing of step 1206, the first subscription data 506 may be updated to modify the data specific to the subscription recipient. In one example, as the subscription boxes are shipped to the recipient, the subscription order engine 402 may update the table in memory 408 storing the first subscription data 506. The table may be updated to include information such as the number of boxes shipped, the products shipped in each subscription box, and feedback provided by the recipient.

For example, the table of FIG. 6 includes rows 11 to 14 that were entered after John Buck's initial purchase of the subscription. Rows 11, 12, and 14 provide indications that the first, second, and third subscription boxes have been sent to Jane Doe. The data entered in row 13 of the first subscription order 409 indicates that Jane Doe has provided TreatTote with feedback, stating that she has a preference for coconut flavored snack foods. The data stored in rows 11 to 14 are all associated with the subscription identifier 508 "AX4C8NjqR753bL", indicating that the updated data is part of the first subscription data 506 in the subscription transfer object 504.

In some embodiments, the processor 404 further generates web content including at least some of the first subscription data 506, and transmits the web content for display on the user device. The subscription order engine 402 may generate the web content to be displayed to the recipient on the user interface 438 of the recipient device 430.

For example, FIG. 10 includes a web page 900 that may be displayed to Jane Doe after she clicks on the hyperlink 802 in the received email 800. The web page 900 includes web content 1000, which includes the statement "My favorite snacks can be described as:" and the selections "Chocolate" and "Coconut". Jane Doe's preference for chocolate and coconut were previously provided to the subscription order engine 402 by John Buck and herself, respectively, during the duration of the gift subscription service. These preferences were previously stored as first subscription data 506 in memory 408, as shown in FIG. 6.

In some embodiments, the generating, by the processor 404, the web content for display on the user device may include generating a message for inclusion in the web content. The message may prompt the subscription recipient to perform at least one of: confirming at least some data included in the first subscription data 506; or, providing the additional information to be stored in the second subscription data 1100.

For example, the web content may be provided to Jane Doe on a web page, such as web page 900 of FIGS. 9 and 10, via the user interface 438 of her recipient device 430. In FIG. 9, the web page 900 contains web content 902, which includes the prompt "To continue your subscription, please enter your billing information". Several fields are provided for Jane Doe to enter the requested billing information within web content 902. In another example, in FIG. 10, the web page 900 contains web content 1000. Web content 1000 includes the prompt: "Based on the information from your gift subscription, we have an idea of what you like to munch on. Please confirm the following, and select more options if applicable". The web content 1000 displays Jane Doe's snack food preferences as stored in the first subscription data 506, and displays a prompt for Jane Doe to optionally select one or more from a list of additional snack food descriptors.

In some embodiments, the processor 404 receives a response from the user device. The response may provide at least one of: confirmation of the at least some data included in the first subscription data 506, or the additional information 1102. Subsequently, the processor 404 may transmit, to the user device, further web content including an order confirmation message. The order confirmation message may confirm establishment of the second subscription data 1100. For example, on web page 900 of FIG. 10, Jane Doe may interact with web content 1000, and select the snack food preference "Crunchy" from the provided list. Jane Doe may confirm her existing snack food preferences "Chocolate" and "Coconut" that are stored as part of the first subscription data 506 by not de-selecting them via web content 1000. Jane Doe may then click the "Next" arrow icon and complete her purchase of the continued subscription service. The preferences: "Chocolate", "Coconut", and "Crunchy" may be stored as part of second subscription data 1100, as shown in FIG. 11. The subscription order engine 402 may then provide web content to Jane Doe's recipient device 430 confirming that the second subscription data 1100 in the second subscription order 411 has been established in memory 408.

In some embodiments, purchaser details (e.g. billing information/details) are stored in association with the subscription, but these purchaser details are not included in the first subscription data 506. For example, the first subscription data 506 may be stored in one partition of memory, e.g. in an object in memory (such as subscription transfer object 504), and the purchaser details are not included in that partition or object in memory, but are instead included in a different partition in memory in association with the subscription. An example is illustrated in FIG. 5 in which the purchaser details 502 are stored separately from the subscription transfer object 504.

In some embodiments, a system is provided for performing the methods described above. The system may include a memory (e.g. memory 408) to store information such as first subscription data 506 for a subscription service purchased online for a subscription recipient. The first subscription data 506 may also include data specific to the subscription recipient, and may be associated with a subscription identifier 508 in the memory 408. The system may further include at least one processor (e.g. processor 404) to perform operations such as: issuing, for use by the subscription recipient, the subscription identifier 508 and a subscription continuation invitation (e.g. by email, such as email 800 of FIG. 8); receiving, from a user device associated with the subscription recipient, an electronic message providing the subscription identifier (e.g. by the network interface 406 receiving the electronic message in the form on an http or https request, and forwarding that electronic message to the processor 404); retrieving, using the subscription identifier 508, the first subscription data 506 from the memory 408; and, storing second subscription data 1100 in the memory 408, including data based on the first subscription data 506 and additional information from the subscription recipient.

In some embodiments, a computer-readable medium is provided having stored thereon computer-executable instructions that, when executed by a computer, cause the computer to perform method steps described above.

Advantages of some embodiments disclosed herein may include: onboarding the gift recipient to continue the subscription in a manner that is possibly faster and more accurate than the new subscription order being generated from scratch; the use of the subscription identifier 508 allowing for automatic linkage of the information in a gift subscription and the information in a new subscription; in transferring of the subscription data in memory, maintaining privacy of the original purchaser because the subscription transfer object 504 only includes information relevant to the recipient, not personal information relating to the purchaser.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
storing, in memory, first subscription data for a subscription purchased online by a purchaser for a subscription recipient different from the purchaser, the first subscription data including data specific to the subscription recipient;
associating the first subscription data with a subscription identifier in the memory;
issuing, for use by the subscription recipient, the subscription identifier and a subscription continuation invitation;
receiving, from a user device associated with the subscription recipient, an electronic message providing the subscription identifier;
retrieving, using the subscription identifier, the first subscription data from the memory; and,
storing second subscription data in the memory, the second subscription data including data based on the first subscription data and additional information provided by the subscription recipient that was not provided by the purchaser, the additional information provided by the subscription recipient including billing information associated with the subscription recipient.

2. The computer-implemented method of claim 1, wherein the issuing comprises transmitting an email including a hyperlink including the subscription identifier, and wherein the electronic message is a request corresponding to following the hyperlink.

3. The computer-implemented method of claim 2, wherein the hyperlink is a uniform resource locator (URL) having the subscription identifier.

4. The computer-implemented method of claim 1, wherein the electronic message is a hypertext transfer protocol (http) request or a hypertext transfer protocol secure (https) request.

5. The computer-implemented method of claim 1, wherein the issuing comprises generating a quick response (QR) code encoding a URL, the URL providing the subscription identifier, and wherein receiving the electronic message comprises receiving a communication based on the URL encoded in the QR code.

6. The computer-implemented method of claim 1, wherein the subscription continuation invitation and the subscription identifier are issued at a defined time in relation to expiry of the subscription.

7. The computer-implemented method of claim 1, wherein the first subscription data includes at least one of:
a selected subscription service;
a time at which the subscription expires or automatically renews;
a frequency at which a package is shipped to the subscription recipient;
a restriction associated with the subscription;
feedback or a preference provided by the subscription recipient;
a shipping address; or,
an indication of one or more previous packages shipped to the subscription recipient.

8. The computer-implemented method of claim 1, wherein, at one or more points prior to the issuing, the first subscription data is updated to modify the data specific to the subscription recipient.

9. The computer-implemented method of claim 1, further comprising generating web content including at least some of the first subscription data, and transmitting the web content for display on the user device.

10. The computer-implemented method of claim 9, wherein, the generating the web content for display on the user device comprises generating a message for inclusion in the web content, the message prompting the subscription recipient to perform at least one of:
confirming at least some data included in the first subscription data; or,
providing the additional information to be stored in the second subscription data.

11. The computer-implemented method of claim 10, further comprising:
receiving a response from the user device, the response providing at least one of: confirmation of the at least some data included in the first subscription data, or the additional information; and
subsequently transmitting, to the user device, further web content including an order confirmation message, the order confirmation message confirming establishment of the second subscription data.

12. A system comprising:
a memory to store first subscription data for a subscription purchased online by a purchaser for a subscription recipient different from the purchaser, the first subscription data including data specific to the subscription recipient, the first subscription data being associated with a subscription identifier in the memory;
at least one processor to:
issue, for use by the subscription recipient, the subscription identifier and a subscription continuation invitation;

receive, from a user device associated with the subscription recipient, an electronic message providing the subscription identifier;

retrieve, using the subscription identifier, the first subscription data from the memory; and, store second subscription data in the memory, the second subscription data including data based on the first subscription data and additional information provided by the subscription recipient that was not provided by the purchaser, the additional information provided by the subscription recipient including billing information associated with the subscription recipient.

13. The system of claim 12, wherein the at least one processor is to issue the subscription identifier and the subscription continuation invitation by performing operations including instructing transmission of an email including a hyperlink including the subscription identifier, and wherein the electronic message is a request corresponding to following the hyperlink.

14. The system of claim 13, wherein the hyperlink is a uniform resource locator (URL) having the subscription identifier.

15. The system of claim 12, wherein the electronic message is a hypertext transfer protocol (http) request or a hypertext transfer protocol secure (https) request.

16. The system of claim 12, wherein the at least one processor is to issue the subscription identifier and the subscription continuation invitation by performing operations including generating a quick response (QR) code encoding a URL, the URL providing the subscription identifier; and, wherein the at least one processor is to receive the electronic message by performing operations including receiving a communication based on the URL encoded in the QR code.

17. The system of claim 12, wherein the at least one processor is further to generate web content including at least some of the first subscription data, and to instruct transmission of the web content for display on the user device.

18. The system of claim 17, wherein the at least one processor is to generate the web content for display on the user device by performing operations including generating a message for inclusion in the web content, the message prompting the subscription recipient to perform at least one of:

confirming at least some data included in the first subscription data; or, providing the additional information to be stored in the second subscription data.

19. The system of claim 17, wherein the at least one processor is further to:

receive a response from the user device, the response providing at least one of: confirmation of the at least some data included in the first subscription data, or the additional information; and subsequently instruct transmission, to the user device, further web content including an order confirmation message, the order confirmation message confirming establishment of the second subscription data.

20. A non-transitory computer readable medium having stored thereon computer-executable instructions that, when executed by a computer, cause the computer to perform operations comprising:

storing, in memory, first subscription data for a subscription purchased online by a purchaser for a subscription recipient different from the purchaser, the first subscription data including data specific to the subscription recipient;

associating the first subscription data with a subscription identifier in the memory;

issuing, for use by the subscription recipient, the subscription identifier and a subscription continuation invitation;

receiving, from a user device associated with the subscription recipient, an electronic message providing the subscription identifier;

retrieving, using the subscription identifier, the first subscription data from the memory; and, storing second subscription data in the memory, the second subscription data including data based on the first subscription data and additional information provided by from the subscription recipient that was not provided by the purchaser, the additional information provided by the subscription recipient including billing information associated with the subscription recipient.

* * * * *